Jan. 22, 1957 H. S. FORSBERG 2,778,395
HANDSAW WITH BLADE HAVING A T-SLOT
Filed Dec. 20, 1954
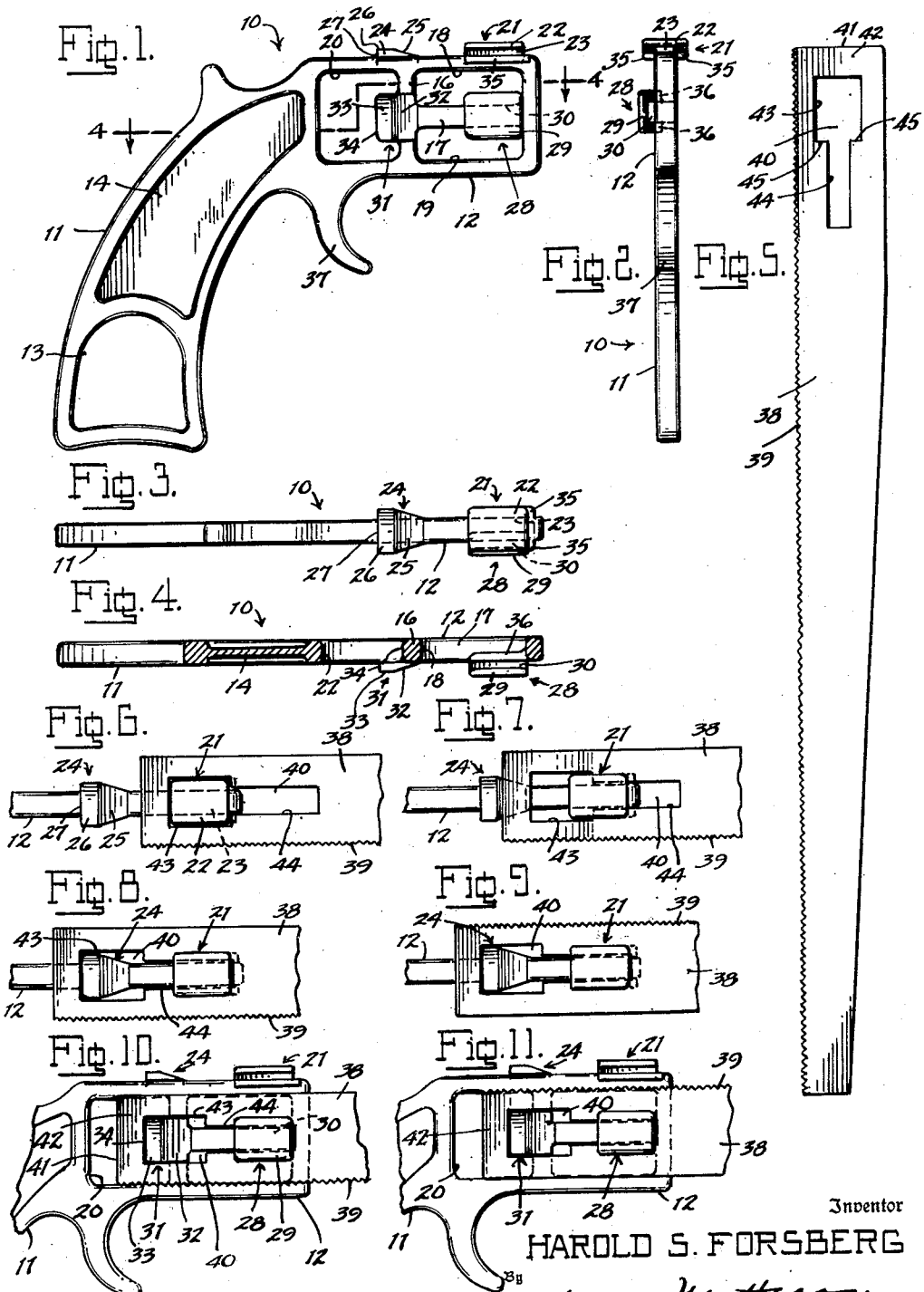
Inventor
HAROLD S. FORSBERG
Attorney

United States Patent Office 2,778,395
Patented Jan. 22, 1957

2,778,395

HANDSAW WITH BLADE HAVING A T-SLOT

Harold S. Forsberg, Stratford, Conn.

Application December 20, 1954, Serial No. 476,227

2 Claims. (Cl. 145—31)

The present invention relates to a saw blade holding device and more particularly to such device in combination with a saw blade.

An object of the present invention is to provide a holder having means thereon for holding blades in different positions.

Another object is to provide such a holder to which blades may be easily fastened or from which they may be easily detached.

Further objects are to provide a blade suitable for use with the holder, and to provide a combination of holder and blade which is relatively inexpensive, durable and reliable in use.

According to the present invention a holder for saw blades is provided comprising a handle portion and a shank portion, the former being preferably of a size which may be easily gripped in one of the user's hands. Joined to the handle portion of the holder is a shank portion, on the top and one side of which is positioned means for fastening a blade, such means each comprising a T-lug, the head of which is longitudinal with respect to the shank, and a locking cam on the said shank spaced longitudinally from the T-lug.

The blade suited for use with the holder of the present invention has a T-slot therein, the head portion of which is of such dimension as to allow it to be slipped over the head of the T-lug on the shank portion. Thereafter the blade is moved longitudinally, as distinguished from angular movement, with respect to the shank portion of the holder. During this movement the side walls of the stem portion of the T-slot are under the head portion of the T-lug. Thus it will be seen that the width of the stem of the T-slot exceeds that of the stem of the T-lug, but is less than the width of the head of the T-lug.

Longitudinal movement of the blade causes a portion of the blade adjacent to the outer end of the T-slot to engage and flex under tension on the surface of the locking cam, thereupon snapping into locked position behind the locking cam as the longitudinal movement of the blade is continued.

The blade may be held by the holder on either the top or side in respective horizontal and vertical positions. In addition, since the blade may be inverted to dispose the cutting edge on either side of the mounting means, the cutting edge of a blade may be placed in any of four different directions.

Other objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings:

Fig. 1 is a side elevation of the saw holding device of the invention;

Fig. 2 is an end elevation as seen from the right of Fig. 1;

Fig. 3 is a plan view;

Fig. 4 is a horizontal sectional view along the line 4—4 of Fig. 1;

Fig. 5 is a plan view of the saw blade for use in combination with the device as shown in Fig. 1;

Fig. 6 is a plan view showing the end of the saw blade as initially engaged with the holding device preparatory to securing the blade to the device, with the blade in horizontal position;

Fig. 7 is a similar view showing the blade moved to an intermediate position in which it is tensioned;

Fig. 8 is a similar view showing the blade moved to its final locked position;

Fig. 9 is a view similar to Fig. 8, but showing the blade with its saw teeth in a reversed position;

Fig. 10 is a fragmentary side elevation showing the blade secured to the device in vertical relation, the saw teeth being downwardly disposed; and Fig. 11 is a similar view showing the blade in reverse position with the saw teeth upwardly disposed.

Referring to the drawings, a holder 10 for saw blades is provided, comprising a curved pistol-grip handle portion 11 and a rectangular shank portion 12 integral with and extending forwardly from the upper end of the handle portion. The curved handle portion 11 has an opening 13 at its lower end for the purpose of enabling the holder to be hung up when not in use, and also to provide lightness of construction. Upwardly adjacent from opening 13 is a recessed area 14 which not only contributes to the lightness of the construction, but also provides an area on either or both sides of the handle for the manufacturer's name, trademark or the like. On the outer and upper portion of the handle, a projection is provided which prevents the operator's hand from riding up the handle and serves as a brace therefor.

The rectangular shank portion 12 is in the form of an open frame having a vertical cross bar 16 extending between its upper and lower sides, and a horizontal cross bar 17 extending from the center of the cross bar to the forward side of the frame, thus providing rectangular openings 18 and 19 respectively above and below the horizontal cross bar and a rectangular opening 20 between the vertical cross bar and the rearward side of the frame. The openings 18 and 19 are primarily for lightness of construction while the opening 20 provides a blade-disengaging finger-receiving space, as will presently more fully appear.

Mounted on the upper side of the shank portion, adjacent to its forward end, is a T-lug 21 having a rectangular head portion 22 and a stem 23. Positioned upon the upper side of the shank portion in spaced longitudinally aligned relation to the T-lug 21, is a locking cam 24 having a rise 25, a level area 26 which is preferably in a plane slightly upwardly offset from the plane of the under surface of the head of the T-lug, and a vertical rearward wall 27. Mounted on the forward side of the horizontal cross-bar 17 of the shank portion, adjacent to the forward end thereof, is a T-lug 28, preferably of the same size and dimension as T-lug 21, having an elongate rectangular head portion 29 and a stem 30. In rearwardly spaced longitudinally aligned relation to the T-lug 28, a locking cam 31 is mounted on the vertical cross bar 16 and is of substantially the same size and dimension as locking cam 24, having a rise 32, a level portion 33 and a vertical rearward wall 34.

As the T-lugs 21 and 28 are of substantially greater width than the thickness of the upper side of the shank portion of the cross bar 17 upon which they are mounted, flanges 35—35 and 36—36 are provided upon the shank portion at each side of the base of the stem portions of the T-lugs. As will more fully appear, these flanges engage the inner side of the saw blade in opposed relation to the engagement of the outer side by the head portions of the T-lugs.

Depending from the underside of the shank portion is an index finger receiving trigger-like member 37 which enables the operator to position his index finger to give support thereto as well as to give support to the saw during a sawing action.

For use in conjunction with the holder described above, a preferred saw blade 38 of flexible resilient metal is provided having cutting teeth 39 along one edge and a T-slot 40 centrally disposed with relation to rearward portions of the longitudinal edges of the blade and spaced from the rearward edge 41 of the blade by area 42. The rectangular head portion 43 of the slot preferably just exceeds the dimension of the head of the T-lugs and the width of the stem portion 44 of the slot is less than that of the lug heads, and preferably of a width which just exceeds the width of the stems of said lugs. Shoulders 45 are provided at the junction of the head and stem portions of the T-slot. The overall length of the T-slot preferably just exceeds the span between the vertical edge of a locking cam and the furthest removed end edge of the stem of the T-lug.

In employing the blade with the holder 10, the installation or fastening of the blade is substantially the same whether the blade is to be positioned on the top or the side of the holder. Thus in positioning a blade on the top of the shank, as illustrated in Figs. 6–8, the operator holds the holder portion in one hand and the blade in another, and thereupon engages the rectangular head portion 43 of the T-slot 40 with the rectangular head 22 of T-lug 21. The blade is then slipped down over the head 22 and slid longitudinally rearwardly causing the edges of the stem portion 44 of the T-slot to become positioned under the head of the T-lug and adjacent to the side walls of its stem. When the edges of the stem portion of the T-slot have been initially positioned beneath the head portion of the T-lugs, the end edge 41 of the blade engages the rise 25 of locking cam 24. As the rearward longitudinal sliding is continued, the area 38 of the blade rides up the rise 25 causing the blade to become flexed from the shoulders 45 of the T-slot to its end 42.

As illustrated in Fig. 8, once the blade clears the level area of the cam, it springs down and is releasably engaged behind the vertical wall 27 of the locking cam 24. In this position the blade is locked against forward movement by the engagement of the rearward end of the T-slot of the blade with the vertical cam wall 27, and is secured against outward movement by the fact that the edges of the stem of the T-slot are positioned between the opposing surfaces of T-lug head 22 and the flanges 35.

Preferably the space between the underside of the head portion and the upper surface of the flanges is slightly in excess of the thickness of the blade employed. This results in less binding of the blade during fastening and removing. It should be noted that the excess should be slight in order to minimize any freedom of movement of the blade.

As illustrated in Fig. 8 the teeth 39 of the blade are illustrated at the right hand edge of the blade, while Fig. 9 illustrates the blade in inverted position with the cutting teeth at the left hand side of the blade.

It will be noted that the T-lugs 21 and 28 are forwardly spaced a short distance from the outer end of the shank portion and that the flanges 35 project slightly rearwardly from the head and stem of the T-lug 21 to provide a bottom guide for easy engagement of the shoulders 45 of the T-slot of the blade beneath the head of the T-lug, the bottom surface of the blade resting upon the projected ends of the flanges 35 to align the shoulders 45 with the slots of the T-lug. In the case of the T-lug 28, the flanges 36 are flush with the side surface of the shank disposed outwardly of the outer end of the T-lug, so that this side surface acts as a guide for guiding the shoulders into the slots of the T-lug 28 in a similar manner to the rearwardly projected portions of the flanges 35.

What is claimed is:

1. In combination, resiliently yieldable a blade having a T-slot including a head and a stem forwardly spaced from its butt end, the head of said T-slot being transverse to the blade, and a holder for mounting said blade, said holder comprising a handle portion and a shank portion, and means on said shank portion for mounting said blade, said means comprising a T-lug including a head and a stem, the head of the lug extending transversely of said shank portion, and a locking cam in longitudinally spaced and aligned relation to said T-lug including a cam rise portion rising longitudinally in a direction away from said T-lug, the head of said T-slot being adapted to have the head of said T-lug passed through it, and the stem of said T-slot being adapted to be engaged by the stem of said T-lug beneath its head upon longitudinal movement of the blade, the head of said T-slot being engageable by said locking cam upon upward flexing of the end portion of said blade adjacent said T-slot as said end portion is longitudinally moved over and beyond said locking cam, the total length of said T-slot being such that when the outer end of its stem is adjacent the outer end of the stem of said T-lug the outer end of the head of said T-slot is adjacent the outer end of said locking cam, and the width of said end portion of said blade being substantially greater than the transverse thickness of said shank portion whereby free spaces are provided at each side of said shank portion beneath said end portion of said blade for applying upward finger pressure on said end portion to flex it upwardly out of locking relation of said T-slot with said locking cam.

2. In combination, a resiliently yieldable blade having a T-slot including a head and a stem forwardly spaced from its butt end, the head of said T-slot being transverse to the blade, and a holder for mounting said blade, said holder comprising a handle portion and a shank portion, said shank portion having a relatively narrow longitudinally extending upper surface and a relatively wide longitudinally extending side surface, and means on said respective upper and side surfaces for selectively mounting said blade, each said means comprising a T-lug including a head and a stem, the head of the lug extending transversely of said shank portion, and a locking cam in longitudinally spaced and aligned relation to said T-lug including a cam rise portion rising longitudinally in a direction away from said T-lug, the head of said T-slot being adapted to have the head of said T-lug passed through it, and the stem of said T-slot being adapted to be engaged by the stem of said T-lug beneath its head upon longitudinal movement of the blade, the head of said T-slot being engageable by said locking cam upon upward flexing of the end portion of said blade adjacent said T-slot as said end portion is longitudinally moved over and beyond said locking cam, the total length of said T-slot being such that when the outer end of its stem is adjacent the outer end of the stem of said T-lug the outer end of the head of said T-slot is adjacent the outer end of said locking cam, and the width of said end portion of said blade being substantially greater than the transverse thickness of said shank portion whereby in the mounting relation of a blade with said upper surface of said shank portion free spaces are provided at each side of said shank portion beneath the end portion of said blade for applying upward finger pressure on said end portion to flex it upwardly out of locking relation of its said T-slot with said locking cam on said upper surface, and said shank portion having a finger receiving opening transversely therethrough adjacent the outer end of said locking cam on said side surface of said shank portion whereby a finger may be engaged through said opening to apply outward pressure on the end portion of a blade mounted on said side surface to flex it outwardly out of locking relation of its said T-slot with said locking cam on said side surface.

References Cited in the file of this patent

UNITED STATES PATENTS

| | | |
|---|---|---|
| 2,137,800 | Davey | Nov. 22, 1938 |
| 2,215,125 | Maltz | Sept. 17, 1940 |
| 2,257,141 | Waugh | Sept. 30, 1941 |
| 2,282,902 | Sultan | May 12, 1942 |
| 2,708,313 | Steele | May 17, 1955 |